(12) United States Patent
Errico

(10) Patent No.: US 8,527,751 B2
(45) Date of Patent: *Sep. 3, 2013

(54) SYSTEMS AND METHODS FOR SECURE AND CERTIFIED ELECTRONIC MESSAGING

(75) Inventor: Stephen Errico, Charlotte, NC (US)

(73) Assignee: PrivacyDataSystems, LLC, Greenwood, IN (US)

( * ) Notice: Subject to any disclaimer, the term of this patent is extended or adjusted under 35 U.S.C. 154(b) by 510 days.

This patent is subject to a terminal disclaimer.

(21) Appl. No.: 12/493,057

(22) Filed: Jun. 26, 2009

(65) Prior Publication Data

US 2010/0257352 A1     Oct. 7, 2010

Related U.S. Application Data

(63) Continuation-in-part of application No. 11/509,279, filed on Aug. 24, 2006, now abandoned, and a continuation-in-part of application No. 11/880,017, filed on Jul. 19, 2007.

(60) Provisional application No. 61/095,279, filed on Sep. 8, 2008.

(51) Int. Cl.
| | |
|---|---|
| *H04L 29/06* | (2006.01) |
| *H04L 9/32* | (2006.01) |
| *H04L 9/00* | (2006.01) |
| *G06F 21/00* | (2013.01) |
| *G06F 7/04* | (2006.01) |
| *G06F 17/00* | (2006.01) |
| *G06F 12/14* | (2006.01) |
| *G06F 17/30* | (2006.01) |
| *H04K 1/00* | (2006.01) |
| *G06K 9/00* | (2006.01) |

(52) U.S. Cl.
USPC ........... 713/165; 713/168; 713/170; 713/171; 713/186; 726/5; 726/13; 726/22; 380/255; 380/44; 382/115; 707/694; 707/696; 707/741

(58) Field of Classification Search
USPC ............. 713/182, 168, 170, 171, 186; 726/5, 726/13, 22; 380/255, 44; 382/115; 707/694, 707/696, 741
See application file for complete search history.

(56) References Cited

U.S. PATENT DOCUMENTS

| | | |
|---|---|---|
| 2002/0007453 A1 | 1/2002 | Nemovicher |
| 2007/0038704 A1 | 2/2007 | Brown et al. |
| 2007/0208952 A1* | 9/2007 | Nation et al. ................. 713/190 |
| 2008/0184374 A1* | 7/2008 | Mohnl et al. .................... 726/26 |

* cited by examiner

*Primary Examiner* — Aravind Moorthy
(74) *Attorney, Agent, or Firm* — Clements Bernard PLLC; Christopher L. Bernard

(57) ABSTRACT

The present disclosure provides systems and methods for secure and certified electronic messaging from a plurality of users to one or more electronic mailboxes and the like using a combination of biometric security, a separate and secure network and email infrastructure, email management processes, and the addition of text, audio and visual format options to sending emails messages.

16 Claims, 10 Drawing Sheets

CLIENT INQUIRY FORM

For correspondence, please complete all fields below to send an ePackage (secure communications) to our company First Name:
Last Name:
Email:
Confirm Email:
Phone No.:
Comments:

Attachments:
File 1: [Browse]
File 2: [Browse]
File 3: [Browse]
File 4: [Browse]
File 5: [Browse]

[SEND]

*FIG. 9*

SYSTEMS AND METHODS FOR SECURE AND CERTIFIED ELECTRONIC MESSAGING

CROSS-REFERENCE TO RELATED APPLICATION(S)

The present non-provisional patent application is a continuation-in-part of U.S. patent application Ser. No. 11/509,279, filed Aug. 24, 2006, now abandoned and entitled "METHOD TO IMPROVE THE INTEGRITY OF INTERNET PROGRAMS, WEBSITES AND SOFTWARE," and U.S. patent application Ser. No. 11/880,017, filed Jul. 19, 2007, and entitled "METHOD TO RECORD AND AUTHENTICATE A PARTICIPANT'S BIOMETRIC IDENTIFICATION OF AN EVENT VIA A NETWORK," both of which are incorporated in full by reference herein. Also, the present non-provisional patent application claims priority to PCT Application No. PCT/US2009/40175, filed Apr. 10, 2009, and entitled "IMPROVED CERTIFIED EMAIL MESSAGES AND ATTACHMENTS," which is incorporated in full by reference herein. Additionally, the present non-provisional patent application claims priority to U.S. Provisional Patent Application Ser. No. 61/095,279, filed Sep. 8, 2008, and entitled "SECURE MESSAGE AND FILE DELIVERY," which is incorporated in full by reference herein.

FIELD OF THE INVENTION

The present invention relates generally to secure electronic messaging. More particularly, the present invention relates to systems and methods for secure electronic messaging from a plurality of users to one or more electronic mailboxes and the like using a combination of biometric security, a separate and secure network and email infrastructure, email management processes, and the addition of text, audio and visual format options to sending emails messages.

BACKGROUND OF THE INVENTION

The use of electronic mail (email) and attachments has grown substantially over the last few decades. Unfortunately, so have the problems of identity verification, security, privacy and proof of delivery; not to mention all the spam, viruses, and other harmful malware which has become the norm with using the popular, everyday email systems like Hotmail, AOL, Gmail and even Outlook. And, most use the "very public and very vulnerable" Internet as their worldwide network.

Millions of these international email users receive emails and attachments from people they do not know or from people they are not certain as to whether "they are who they say they are". The challenge is how does a recipient determine the legitimacy or know the true intentions of the sender in the world of the "Unvetted Public Internet". Before a user opens their latest emails and/or attachments, they pause and worry; even when the senders' names are familiar to them, like a friend or their local banker. The questions—"is that really you?" and "what are your intentions?" haunts every recipient as they decide to either open or delete the latest entries in their Inbox. And, as spam filters try to assist, they often catch the good emails (with the bad) that users do want, causing them to continually review the contents of the spam log to identify and retrieve them for normal viewing.

Even the senders of emails worry and wonder if what they send gets to the right location or to the intended person, especially when exchanging important (e.g., confidential), high-value email messages and files. When the user hits the "send" button they are not certain that their message is secure, private, or if it gets to their named recipient or falls into the hands of an unintended recipient. Many emails never get to their intended recipient (for a variety of reasons) and that both the sender and recipient are never notified of that fact? In addition, if proof of delivery is important, how can senders prove the email got to the right location, the intended recipient and whether it was viewed and/or downloaded by the correct person? Or, might it have gone to, or been intercepted by, someone maliciously pretending to be the recipient? Or, might the recipient say they never received it when they actually did? All it takes these days in most everyday email systems is to know someone's User ID and password and they can wreak havoc in their personal or professional lives, or even cause the demise of a publicly traded company if insider information (within an email message) is stolen or intercepted by those not intended to see such confidential information. For more sophisticated intruders, many other tools and techniques are available to intercept and disrupt a supposedly-private communication.

Some earlier (so-called) certified email efforts have produced companies that have tried to provide certification services (to prove the trustworthiness of the senders). But, they do so within the low-security infrastructure of the popular, everyday email systems like Hotmail, AOL, Gmail and Outlook and the "very public and very vulnerable" Internet they use as their worldwide network. Plus, they allow marketing companies to become users of their service, which then try to give their mass number of recipients the feeling that their emails are worthy of opening. So, the sender of certified email in this environment may not have included a virus or malware in it, but it is still "junk mail" (a.k.a. unwanted spam) if it was unsolicited.

As a result, millions of senders and recipients worldwide spend billions of dollars each year to exchange "paper documents" via FedEx, UPS, Certified Postal Mail, and other international package delivery services; often simply to insure that the documents get there and to have some way of proving it. Although, these services simply get their package to "an adult at the address specified", and make no guaranteed (or effort) to get it to the person named on the delivery form. Such delivery concerns, even minimally resolved, are causing senders and recipients to endure these substantial expenses and time delays. Many of these same documents could easily be exchanged electronically in their everyday email systems, but they require 1) recipient identity verification, 2) security and privacy and 3) proof of delivery.

To fully and effectively communicate in an email message, the sender must have three message format options (text, audio and visual), plus some number of attachments. This is because in human communications, when two parties are not physically together, the exchange can involve only these three dimensions (i.e., smell and touch being the missing dimensions). It has been proven that this type of three-dimension message configuration has the following value and effectiveness for each of the three; 7% to the words (text), 38% to "how" they are audibly spoken (e.g., intonation, cadence, modulation . . . ) and 55% to the body language (the visual) of the speaker.

So, with a maximum of 100% effectiveness as a possibility, a text-only email message can be no more than 7% as effective as a comparable visual (video) message, with sound. An audio-only email message can be no more than 45% as effective as a comparable visual message, with sound. The "benchmark" against which all remote communications are valued in effectiveness are based on a visual message with sound that allows the recipient to hear the words spoken and see the speaker's body language (e.g., facial expressions, posture, hand motions, head motion and so on). Yet, even if 100% effective communication options were possible today in most popular message exchanges, many senders and recipients would be reluctant to use them for fear that such crisp, clear and concise messages might fall into improper hands due to lesser security and greater vulnerability of popular, public-Internet-based email systems.

BRIEF SUMMARY OF THE INVENTION

In an exemplary embodiment of the present invention, an electronic messaging method includes receiving a request to send an electronic message, wherein the electronic message includes any of text, audio, video, and file attachments; authenticating a sender of the electronic message; receiving the electronic message through a first secure connection; storing the electronic message; alerting a recipient of the electronic message; and delivering the electronic message through a second secure connection to the recipient. The electronic messaging method further includes registering the sender prior to receiving the request to send the electronic message, wherein registering includes capturing a fingerprint scan of the sender and storing a private key in an authentication database responsive to the fingerprint scan. The authenticating a sender includes sending software code to the sender to initiate a biometric authentication; scanning a fingerprint of the sender; creating a numerical index of the fingerprint responsive to the scanning a fingerprint to form a public key; receiving the public key over a third secure connection; and authenticating the public key with a corresponding private key in the authentication database. The electronic messaging method further includes encrypting the electronic message prior to storing the electronic message. The electronic message is encrypted with one of Triple Data Encryption Standard (T-DES) and Advanced Encryption Standard (AES) encryption and stored in a secure data store. The first secure connection and the second secure connection each include a Hypertext Transfer Protocol Secure (HTTPS) connection. The electronic messaging method further includes tracking the electronic message by updating a log responsive to activity associated with the electronic message; and certifying delivery of the electronic message responsive to authenticating the recipient and delivering the electronic message to the recipient. The electronic messaging method further includes providing a webpage for an organization; and providing a Uniform Resource Locator link for a corporate inbox including the recipient; wherein the sender initiates the receiving, authenticating, receiving, storing, alerting, and delivering steps responsive to clicking on the Uniform Resource Locator link.

In another exemplary embodiment of the present invention, an electronic messaging system includes a hosted server including a network interface connected to the Internet, a data store including storage for electronic messages and software code, and a processor; an authentication database connected to the hosted server, wherein the authentication database includes a plurality of private keys for authenticating a plurality of users; wherein the processor is configured to: receive a request to send an electronic message, wherein the electronic message includes any of text, audio, video, and file attachments; authenticate a sender of the electronic message through a public key comparison with the plurality of private keys; receive the electronic message through a first secure connection; store the electronic message in the data store; alert a recipient of the electronic message; and deliver the electronic message through a second secure connection to the recipient. The processor is further configured to register the sender prior to receiving the request to send the electronic message, wherein registering includes capturing a fingerprint scan of the sender and storing a private key in an authentication database responsive to the fingerprint scan. To authenticate a sender, the processor is configured to send software code to the sender to initiate a biometric authentication; scan a fingerprint of the sender; create a numerical index of the fingerprint responsive to the scanning a fingerprint to form a public key; receive the public key over a third secure connection; and authenticate the public key with a corresponding private key in the authentication database. The electronic message is encrypted prior to storage in the data store. The electronic message is encrypted with one of Triple Data Encryption Standard (T-DES) and Advanced Encryption Standard (AES) encryption. The first secure connection and the second secure connection each include a Hypertext Transfer Protocol Secure (HTTPS) connection. The processor is further configured to track the electronic message by updating a log responsive to activity associated with the electronic message; and certify delivery of the electronic message responsive to authenticating the recipient and delivering the electronic message to the recipient. The electronic messaging system further includes a webpage for an organization; and a Uniform Resource Locator link for a corporate inbox including the recipient, wherein the Uniform Resource Locator link is located on the webpage.

In yet another exemplary embodiment of the present invention, an electronic messaging method through a webpage includes accessing a webpage through a web browser; clicking on a link on the webpage to send an electronic message to a recipient, wherein clicking on a link creates Hypertext Transfer Protocol Secure (HTTPS) connection to a server; composing the electronic message including any of text, audio, video, and file attachments; and sending the electronic message to the server through the HTTPS connection. The recipient is an owner of the webpage and the link includes a Uniform Resource Locator link for a corporate inbox including the recipient on a contact us portion of the webpage. The electronic messaging method further includes receiving authentication software from the server through the HTTPS connection; and providing authentication to the server, wherein the authentication is performed through a fingerprint scanner connected to a computer used by the sender to access the webpage. The electronic messaging method further includes certifying delivery of the electronic message.

In yet another exemplary embodiment of the present invention, a method of secure authentication over the Internet includes providing authentication software to a user over the Internet; scanning the user's fingerprint; converting the scanned user's fingerprint to a numerical value; transmitting the numerical value as a public key over the Internet; and matching the public key to a private key. The method further includes registering the user by scanning the user's fingerprint and creating the public key and the private key; and storing the private key in an authentication database.

In still yet another exemplary embodiment of the present invention, a secure inbox for receiving electronic messages includes a hosted server including a network interface connected to the Internet, a data store including storage for electronic messages and software code, and a processor; a webpage generated by the hosted server, wherein the webpage includes: a user-fillable form for user contact information; a plurality of fields for attaching files, wherein the user-fillable form and the plurality of fields are operable for creating a secure electronic message; and a send field, wherein responsive to activating the send field, the user contact information and files in the plurality of fields are sent over a secure HTTPS connection over the Internet to the hosted server.

BRIEF DESCRIPTION OF THE DRAWINGS

The present invention is illustrated and described herein with reference to the various drawings, in which like reference numbers denote like method steps and/or system components, respectively, and in which:

FIG. 9 is another webpage illustrating a user interface (UI) sending a certified ePackage according to an exemplary embodiment of the present invention.

DETAILED DESCRIPTION OF THE INVENTION

In various exemplary embodiments, the present invention provides systems and methods for secure electronic messaging from a plurality of users to one or more electronic mailboxes and the like using a combination of biometric security, a separate and secure network and email infrastructure, email management processes, and the addition of text, audio and visual format options to sending emails messages.

Figure 1:
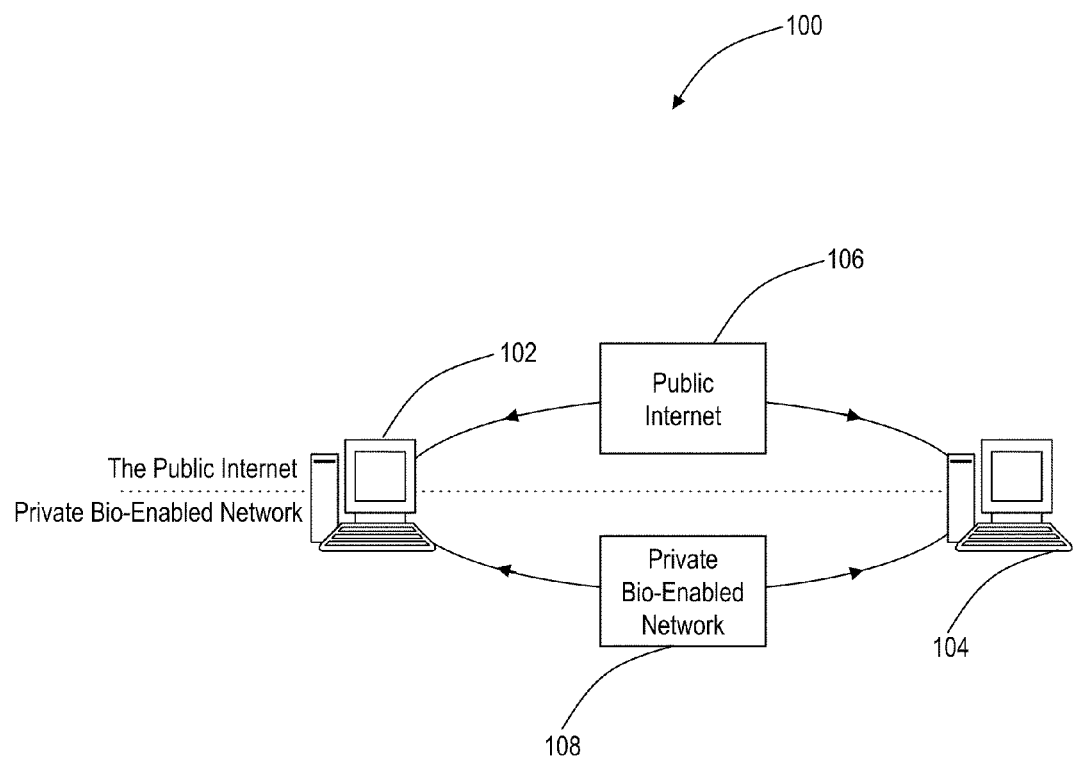
FIG. 1 is a high-level network diagram of a message exchange between two users interacting in the Public Internet versus a Private, Bio-Enable Network according to an exemplary embodiment of the present invention.

Referring to FIG. 1, a high-level network diagram 100 illustrates a message exchange of two users 102, 104 interacting in the Public Internet 106 versus a Private, Bio-Enable Network 108 according to an exemplary embodiment of the present invention. In this diagram 100, the users 102, 104 represent a person, organization, etc. with the ability to send electronic messages over the Internet 106. Electronic messages can include electronic mail ("email"), file exchange such as through email attachments or file transfer protocol (FTP), audio-visual messaging, instant messaging, text messaging, and the like. Disadvantageously, conventional message exchanges over the Public Internet 106 includes minimal security, unvetted senders/recipients, lack of bio-identify verification, limited proof of delivery, limited encryption, limited large file support, substantial virus/malware exposure, endless spam, and the like.

The present invention provides a biometric-enabled, point-to-point encrypted, certified electronic messaging system over the Private, Bio-Enable Network 108 providing a worldwide community of users with the highest levels of identity verification, security and privacy, and proof of delivery when exchanging important, high-value email messages and files. Messages can be in text, audio and visual formats, with large attachments (e.g., up to four gigabytes in size, but larger sizes are also contemplated). Recipients can either read the sender's email text message, hear the sender speak the message, or watch (and hear) them speak.

Professionals wanting a complete solution and worldwide eDelivery options designed to be a maximum-security, as-needed alternative to their everyday email systems, including; Corporate Executives, Entrepreneurs, Government Representatives, Security Specialists, Lawyers, Accountants & CPA's, Bankers, Doctors, M & A Professionals, Students, Researchers, Consultants, Engineers, Designers, Builders, Realtors, Photographers, Musicians and other Professionals.

Advantageously, the present invention provides certified email or other electronic messaging senders and recipients with the highest levels of Biometric Identify Verification, Security and Privacy, and Proof of Delivery. Additionally, the present invention supports various message formats as well. By utilizing state-of-the-art biometrics (initially registered fingerprint scans), the ultimate in identify verification; which confidently answers the question, "Is that really you?" Various levels of vetting are provided via Credit Card authorization, fingerprint scan, Notary Public certification, phone number, address, email address, and the like. By utilizing its own private, fully-encrypted, network and infrastructure for exchanging personal messages, i.e. the Private, Bio-Enable Network 108, the present invention avoids the privacy and security problems that come with many everyday, public email systems and their use of the low-security and vulnerable public Internet 106.

The present invention provides enhanced Proof of Delivery by utilizing its email management processes for email composition and logging (recording) all related delivery events as they occur, such as: when the sender's certified email was sent, when an alert notification (eDelivery email form, SMS, IVR, . . . ) was sent to their recipient(s), if and when the certified email was "signed for" (and how they signed—e.g., by fingerprint scan or electronic signature, this is called "delivery acceptance"), and if and when an attachment was viewed and/or downloaded. The present invention also can utilize three sender options for creating a message itself, 1) text (words), 2) audio (voice message) and 3) visual (video with sound). Again, recipients can either read the sender's email text message, hear the sender speak the message, or watch and hear them speak it. This multi-option set of formats is not the simple attaching of text (the written word), audio (voice) or visual (video) files to an email message. These message options relate to integration with, and are specific to, the main purpose of the email message itself, and are not "just attachments" to an email. The addition of audio and visual format options to the standard text format option provides senders more effectiveness, more preciseness, more personalization and more flexibility (e.g., no keyboard use necessary) in creating their communications with the intended recipient.

The main purpose of an email is to communicate a message (thought, idea, reaction, instructions, etc.) or to introduce an attachment(s). The challenge is that the written word is not always the most convenient, expeditious or appropriate way to communicate to others. But, it is the standard in our everyday email exchanges. Envision hearing these messages in an audio format or even watching them in a visual (video) recorded format. For example: "Joe, I received your proposal and don't have time to write a formal response. So, until I can do that, this message will highlight my main concerns, first . . . "; "Susan, I couldn't reach you by phone and didn't want to leave a voice mail at the house. Please accept my heart felt condolences on the loss of . . . "; "Larry, this is one of the most difficult things I've ever had to do and I wanted to be sure you heard it directly from me, even though you're half way around the world right now. I've decided . . . "; "Vladimir, I tried to apply what you taught me and write you a note in Russian . . . but I struggled. So, I'll have to settle for the spoken word at this time. So, here goes, dobro pozhalovat . . . " The ability to conveniently record and send such an audio or visual message within a certified email system (along with its biometric identity verification, secure infrastructure and proof-of-delivery features), provides senders the effectiveness, precision, personalization and flexibility mentioned above, all within a safe and secure environment.

If the email message included an introduction of an attachment(s), which is common, the examples might read, sound or look like this: "Linda, Guess what? I'm engaged. Here's my new ring . . . can you see it? I'm so excited. John is so wonderful and kind. Look at the attachment and you'll see him at one of his charity events. He's so handsome. Call me today and I'll give you all the details. Don't tell anyone you saw my ring until I tell others about it. See ya again later."; "Mom, it's your favorite, penniless son far away at college. I had to buy these really cool new glasses. Don't I look great! What do you think? By the way, attached is the Optometrist bill. Love ya . . . you're the best!"; "Dr, Edwards, I have this new growth on my nose and I'm very worried. I'll lean forward here so you can get a better look. What do you think? Please let me know what I should do. I'm very concerned. I'm sure you can see that on my face. I took a close-up picture and attached it as well. Please send me a confidential response to this." In scenarios like this, especially if they were in a visual format, it is as if the recipient was sitting across from the sender as they listened and/or viewed the certified email message.

The inventors have an initial preferred embodiment of a company, a website, a network, an infrastructure, a series of servers, an email management system and an operator to support the implementation of a certified email system with the main processes described below. Such website, network, infrastructure, servers and email management system is collectively the first-ever, biometric-enabled, point-to-point encrypted, certified email system providing a worldwide community of users with a "complete solution" including the highest levels of identity verification, security and privacy, proof of delivery and effectiveness in communications when exchanging important, confidential, high-value email messages and attachments. These email messages can be communicated in text, audio and visual formats, and include large attachments, for example 4 gigabytes or larger in size.

It's important to point out that there are usually two email systems used with the Invention. First, there is the registered user's current, everyday email system (e.g., Hotmail, AOL, MSN, Outlook, etc.), if they have one, where they will receive alerts (called eDelivery forms) from the Invention that say "you've got certified mail". Note—such alert notices can also be sent to a user's cell phone (via SMS—Short Message System) or to their land line phone (via IVR—Integrated Voice Response), or equivalent, if such alert options are selected by the user. Second, there is the Invention's separate, private, high-security email network and infrastructure (including secure servers) that such users utilize when actually sending, receiving, tracking and managing email messages and attachments via the Invention's website (referred to as "website" or "system" or "the Invention's website or system" in the process discussion below). Just as the Post Office, FedEx and UPS uses completely different processes and infrastructures for their certified mail/package delivery services, the Invention uses a similar separation concept in its management and transport of certified email messages and attachments.

Figure 2:
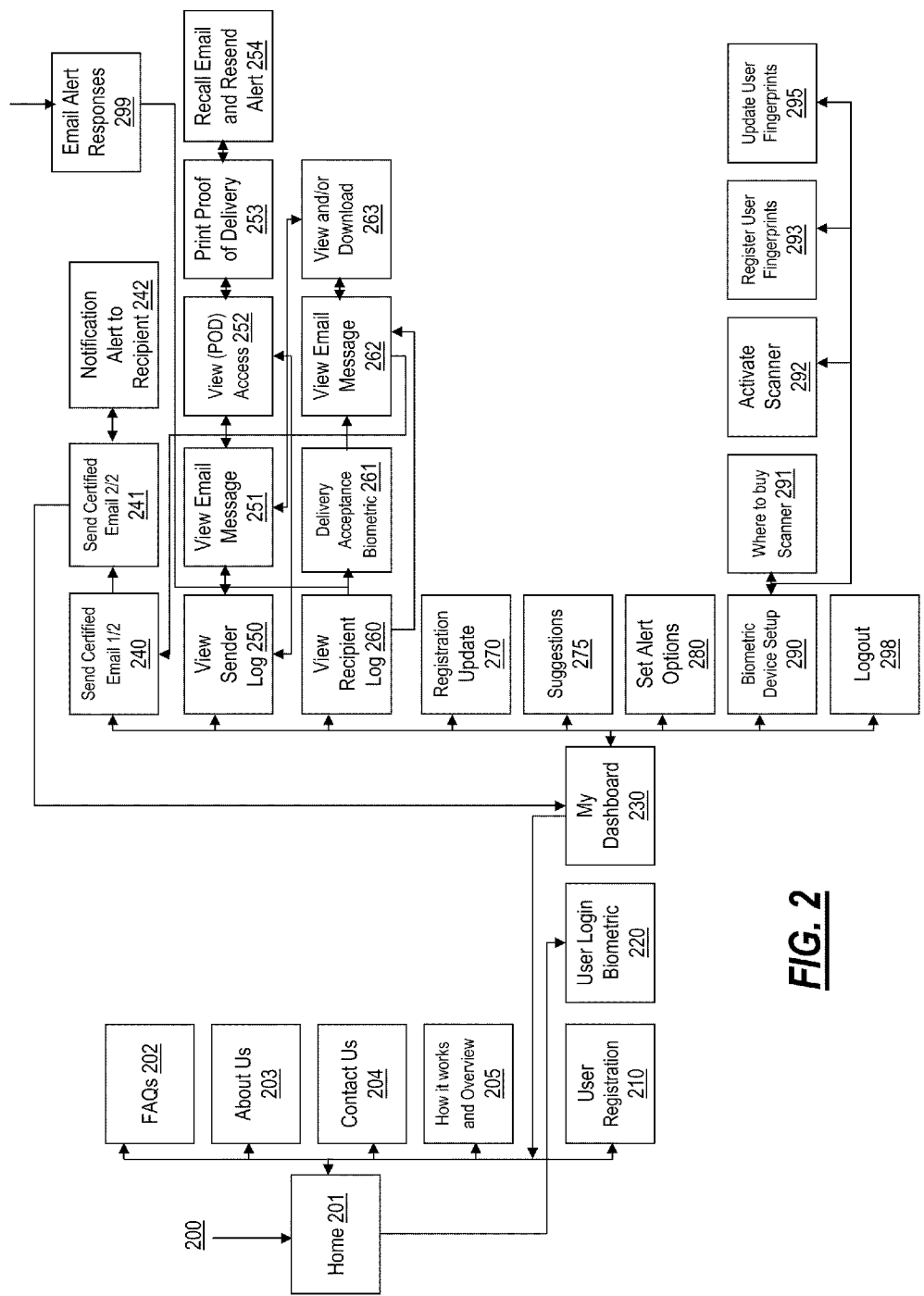
FIG. 2 is a flowchart of various processes associated with creating, sending, and managing certified electronic messages according to an exemplary embodiment of the present invention.

Referring to FIG. 2, a flowchart illustrates various processes 200 associated with creating, sending, and managing certified electronic messages according to an exemplary embodiment of the present invention. These processes 200 are executed on one or more computers or servers connected to a network, such as the Internet. Collectively, the processes 200 enable a user to send a certified electronic message to another user. A Home process 201, as illustrated in FIG. 2, is the starting point for users of the present invention. Note that processes 201 through 299 are all illustrated in FIG. 2. The Home process 201, allows users to become more informed as to the present inventions' features, functions and purpose through access to Frequently Asked Questions (FAQ's) 202, About Us 203, Contact Us 204 and How It Works 205.

To become a user of the present invention, a visitor selects a User Registration process 210 to fill out required user information, including (for example) an existing email address they want to use as their User ID when logging into the website, and a password. This process allows users to register to officially use the Invention and is designed to do initial vetting of the users. Other information gathered can include: name, address, phone number, and credit card number; to insure the operator has a good understanding of who is using the Invention. Other user information is gathered in other processes, for example, a user's fingerprint and a Notary Public certification. They can also receive a registration confirmation notice at the email address they supplied (or by SMS or IVR, if such option is selected by user) and they will have to respond in order to activate their user status and be able to login to the website going forward. If they do not receive an email confirmation notice, they should be sure that their spam filter has not intercepted it for some reason; that happens occasionally when using the email notice option.

The present invention's certified email messages and attachments are private and confidential between sender and recipient, and its registered users are vetted in many ways (credit card, fingerprint, notary certification, phone number, address, email address and more). And, such vetting levels are displayed by the system to both senders and recipients. The system does not allow mass marketing companies, who send large numbers of emails to recipients (that they may or may not know), to become registered users of the website. These companies and spammers in general have no ability to send large numbers of emails in the Invention; which has purposely limited the number recipients per email to dissuade any such attempt by any registered user. The present invention works on the premise that vetted user/senders (identified at various levels) are far less likely to intentionally send a virus, spyware or other malware in their emails and attachments. A registered user's current, everyday email address is often used as their User ID in the Invention's website. Their cell phone number or landline phone number can also be used as a User ID in the system as well as a user-selected ID. These are also a key in its databases and can only be changed by special system request.

Registration and usage of the website or system can require paying a monthly or annual fee; or, a per-unit (per email) fee can be charged. There are many ways to charge for such services. Registered users of the Invention can initially have service levels as follows (which are subject to change): 1) unlimited sending and receiving of local and international emails via the system, each with a 4 GB attachment maximum, 2) 10-20 GB in long-term attachment storage and 3) 100 GB in monthly download bandwidth. Additional storage and bandwidth can be purchased.

To get started after a new user's status is activated, the user selects a User Login process 220 to sign in and start a user session. After login, the user automatically proceeds to a "My Dashboard" process 230 (further described below). This requires the User ID and password to be provided during the registration process. Once the user installs an approved fingerprint scanner and registers their actual fingerprint with the system (and optionally confirms it with a separate Notary Public certification), which activates the biometric features of the system, then users can scan their fingerprint in lieu of entering the password. As a bio-registered user that uses their fingerprint scanner to login, a recipient sees that the sender is at one of the highest levels of vetting in the system and their emails are identified as being "biometrically certified".

To send or compose a certified message or mail, the user selects "Send (Compose) Certified Mail" processes 240, 241 to compose certified email messages and send each to a set number of recipients at a time. After initially registering, it is suggested that a new user send the system a certified "Hello" email. The user can send one to themselves as well to experience the recipient "delivery acceptance" process and add an "Access Code" (a secret code only they and their recipients know) to make it even more secure. The access code is predetermined between sender and recipient and can be used in combination with an electronic signature, a fingerprint, or both. When users select the "Send (Compose) Certified Mail" processes 240, 241 and begin with the process 240 then proceed to the process 241 to create their certified email and identify the recipients. There are a variety of reasons for this two-step compose process, including the need to determine if the specified recipients are already registers users (and if they have their fingerprint registered as well); which would give the sender more options to specify their recipients' delivery acceptance rules. They can enter a text version of the email "subject line" and "message" (other formats described below) at this point and identify all intended recipients. If such an alert option is selected in a process for setting alerts, the email subject line is also displayed in the alert notice (eDelivery form), generated in process 242, sent to the recipient to inform them that have certified email waiting for delivery. The subject line gives them an idea of what the email concerns.

Because the system informs the user/sender if they have entered an email address for a registered or unregistered recipient, as they proceed from processes 240 to 241, senders can then set the delivery acceptance rules for each recipient and select their attachments in process 241. These delivery acceptance rules can include 1) an electronic signature (the default), 2) an access code (a secret code or password only known by the sender and the recipient), 3) a fingerprint scan to insure the recipient's identity (note—the system knows if a recipient has activated this biometric capability), and 4) the sender can insist that a non-registered recipient registers before taking delivery of their certified email. For non-registered recipients the sender is required to spell their name (first and last) for the system so the electronic signature process knows what name to check for during delivery acceptance.

Audio and visual email message format options, also created on the "Compose Certified Email" process, are described below. Email Message Format Options—the "Send (Compose) Certified Email" process 240 supports three options (text, audio and visual) for the email message formats that users can select (plus any number of attachments in process 241). This adds flexibility and precision to a user's email message exchanges, as previously explained herein. So, after recipients "take delivery" of a sender's email, they can read the words written by the sender, hear the sender speak their words or see and hear them speak their words. The numerous combinations of text, audio and visual formats, presented in an integrated and coordinated fashion within the Invention's certified email system, create an appealing and powerful way to send email messages, including: 1) a text message by itself, 2) text message and attachment, 3) audio message, 4) audio message and attachment, 5) visual message, and 6) visual message and attachment. The combinations are many and ultimately get to this combination: a text message, an audio message, a visual message and an attachment (one or many).

In the "Attachment" process (a sub process within Send-Compose Email Message process 241), the Invention's system allows for the attachments in many formats such as PDF, DOC, pictures, voice files, movie files, virtually any of the formats can become attachments within the system's secure environment. In this system, the user is essentially uploading their attachments to the Invention's secure server rather then attempting to send them to, and risk clogging up of, the recipient's everyday email system. This is particularly a problem with very large files causing many such emails to be rejected (a.k.a. "Undelivered Mail Returned to Sender"). When a recipient receives (i.e., takes delivery of) the system's certified email message (in process 261) they also can take delivery of the attachments (in process 263 via process 262), if supplied by the sender. The sender can also designate whether the attachment can to be "viewed" only or if the recipient cam also be allowed to actually download it (see process 263). If view only, the file does not physically leave the invention's secure servers and, as a result, is not transferred to the recipient's computer. Each of these actions is logged, as they occur, to provide the sender proof of delivery and proof of what files were delivered and how.

Alert Notifications, i.e. "You've got certified email" alert notices, are sent in a Notification Alert to Recipient process 242 to all recipients based on the alert options set by the user in "Set Alert Options" process 280. Alert notices can be sent (potentially multiple times, to insure prompt pick up) via email, cell phone (using SMS) or landline phone (using IVR). Alerts sent via email can include (if such option is selected by user) a Uniform Resource Locator (URL) link back to the Invention's website where the user can gain access to the certified email and its attachments. But, first they must go through a Delivery Acceptance process 261. If such option is selected by the user in the process 280, alerts can also be sent to users of the system to indicate that activity has occurred on certified emails and attachments they have previously sent. This could include, for example, that a recipient has taken delivery of (e.g., signed for delivery) of the email the user sent them. This saves the user from having to log into the system to determine that this has occurred. For textual, audio and visual email messages sent by users in the Send (Compose) Certified Email processes 240, 241, such certified messages can also be delivered directly to a cell phone (or cell phone-computer device like the Apple iPhone) or landline phone via IVR as long as the recipient can prove who they are and can meet the delivery requirements (e.g., identity verification) set by the sender in process 241.

Users can select a "View Sender Log" process 250 or a "View Recipient Log" process 260 to monitor the sending and delivery process for certified emails. Remember, when users send a certified email via the website, an alert notice is also sent to their recipient's email address in the process 242 which contains a "you've got certified mail" notice and a URL link back to the system's separate, high-security infrastructure where they can "sign for" and "take delivery" of the sender's private email message in the Delivery Acceptance process 261 (e.g., electronically sign for delivery, similar to the FedEx or UPS process when they come to a recipient's front door) and any attachments the sender may have also sent. After delivery acceptance, users can view, hear or see the certified email message in a View Email Message process 262 and access related attachments in View and/or Download Attachments process 263.

The sender and recipient logs (the processes 250, 260) in the Invention provide valuable tracking information. They tell the sender (and recipient) when the user's certified email was sent, when an alert notice email was sent to the recipient(s), if and when the certified email was "signed for" (called "delivery acceptance" process 261), and if and when it was viewed and/or downloaded. Note—if a user is logged in (process 220) to the website and receives an email from another registered user of the system (or from themselves when testing the Invention), they can take delivery (process 261) of the email from within the website directly from the Recipient Log process 260, just as if they had clicked the link provided on the alert notice email from the sender, if so selected by user in the Set Alert Options process 280. Note—such alert notices can also be sent via cell phone using SMS or landline phone using IVR, or equivalent, if so selected in the process 280.

From the View Sender Log process 250 senders can "recall" or "resend" (in process 254) their previously sent certified email messages and attachments, sent via the Invention. This gives the sender the ability to quickly react if they made a mistake or if the recipient wanted the alert notice sent to a different address or in a different format. In other, everyday email systems, there is no certainty that a sender can successfully recall (pull back) an email before it is placed for viewing in the recipient's email system (especially if there are multiple recipients). This Invention does allow the sender to recall the certified email and be certain, by viewing the related sender log entries (in processes 250, 252), that a specific recipient (which could be one of many) has or has not yet seen the contents.

Print Log and Proof of Delivery Document—Users can print a "Proof of Delivery" (a.k.a. "Proof of Service") document in process 253 by going to the View Sender Log process (250) and selecting a specific email that was previously sent and then selecting "Access". This access log receipt process 252 displays the Email and Attachment Access Log with all the delivery activity events (listed above) on this certified email to date. Select the "Print POD Log" process 253 to print the "Proof of Delivery" document which shows the original certified email contents and lists attachment(s). It also lists all recipients and the delivery acceptance requirements that were set by the sender. Also, a log of events will be displayed that shows all relevant delivery activity for the selected email. Proof of Delivery emails and CD's (or other media) can also be available to allow the actual attached files and voice and visual/video files be made available to those want to prove the circumstances related to such certified emails and attachments sent via the Invention. This Proof of Delivery can potentially be used for various purposes, such as, for example, legal service and the like.

Fingerprint Scanners are utilized in the present invention, i.e. refer to the Biometric Device Setup process 290 for general information on all such devices and their activation. The Invention's system supports fingerprint scanners in its biometric identity verification processes and can be purchased via the website's operators or elsewhere on the Internet. Refer to Where to Buy Fingerprint Scanner process 291 for specific information on where and how to buy such a device. The Invention can support a U.are.U 4000B USB Reader from DigitalPersona, Inc. of Redwood City, Calif., and may support other vendors' devices in the future. The system also supports other models of DigitalPersona's biometric product line, including those that are built into many popular computer laptops like those from Dell and Lenovo (previously IBM). If not a "built-in" as just mentioned, the system's users have to buy specific, approved fingerprint scanner devices from the Invention's operators or as directed in process 291 because such devices may have to utilize drivers modified to support the Invention's unique, browser-based biometric implementation and operational processes. If users already own a 4000B USB reader, they may need to contact the system's operator for special instructions on installation (refer to process 290). Note—until users have an approved scanner, ignore (bypass) the fingerprint process on the Login process 220. In the interim, registered users can use (for example) their email address and private password to complete login. Once a biometric identity capability is implemented, this option to use a password may or may no be approved, based on several variables and user set options.

A user can select a "Registration Update" process 270 to make basic changes in user information. Some user information cannot be changed on this screen and, as a result, users have to contact the operator to help with that change (e.g., email address as the user's User ID). This is necessary because this has become a "key" field in a database and must be changed in a special process. Notice that the website can be optionally gathering the user's cell phone number as well because the system can be sending text alerts messages (in the Notification Alert to Recipient process 242) to cell phones (and to land line phones, as telephone companies implement this and equivalent features in the future), based on user options set in the Set Alert Options process 280.

A user can select the Biometric Device Setup process 290 to setup and activate biometric devices supported by the Invention. Fingerprint scanner software drivers can be downloaded and the device activated in an Activate Fingerprint Scanner process 292 to support the installation on the user's computer. And, a user's actual fingerprints can be initially "registered" in a Register User Fingerprint(s) process 293 and subsequently updated (changed) in an Update User Fingerprint process 294. This means the user's fingerprint is scanned and a numeric representation is stored for use in the Invention's matching and identification algorithms. As other devices are added to the Invention's biometric capabilities, the process 290 can be expanded. Note—the system does not store the actual fingerprint image for any of its registered users; rather a numeric representation.

The "My Dashboard" process 230 provides a view of the registered user's personalized Dashboard which provides a high-level, control window for the user's many global communications activities in the system. The Dashboard is where users land (go to) after each Login process 220 and after the Send (Compose) Certified Email processes 240, 241 and both View Log processes 250, 260. The Invention uses a window on this screen to inform all registered users with various news and update items. The Invention can also provide a ticker tape (rolling) window here to display and monitor, as they occur, the delivery activity events of many certified emails simultaneously, and provide other insightful real-time statistics about the user's entire experience with the Invention. Lastly, select a "Suggestions" process 275 to let the websites operators know of user suggestions and problems, as they occur. The Invention provides FAQ's 202 that are very helpful in answering user questions. A Log Out process 298 is used to log out and terminate the current user session of the Invention's website.

In an exemplary embodiment, a method of communication between a sender and a recipient initiates once a sender logs onto "SenditCertified.com", a private network, and identifies themselves. The sender composes a message via text, audio and/or video format on a network device. A network device is a computer, a cellular phone, a PDA, or other type device capable of communicating with a server or computer. The sender then seals the message via a biometric identification, secret access code, electronic signature or by independent verification. In other words the sender seals the message by identifying himself or herself, preferably by biometric identification. Thereafter the server of the private network encrypts the message and the sender sends it to the recipient over the private network. The private network does not use the Internet, does not use server to server duplication or store and forward protocol. The encrypted message proceeds from the sender's network device to the private network server where it waits delivery to the recipient. The server notifies the recipient of the message and states the conditions under which the recipient can take delivery of the message. After the recipient meets the conditions to take delivery, the server un-encrypts the message and the recipient takes delivery of the message, via a second network device, which may be under the control of the recipient.

The server tracks the progress of the send message, records the tracking information, such as time and place sent, size of message, type of message, conditions of delivery, and recipient identification, such as name, secret access code, biometric identification information and/or other information of recipient. The biometric identification may be fingerprinting, iris scan, facial recognition, or DNA. Preferably the biometric information is fingerprinting. Additionally, the sender and recipient may confirm their identity via an independent vetting process with said private network. The independent vetting process may include electronic signature, secret access code, or other independent information, such as credit card numbers, answering secret questions, driver's license, and/or passport or social security information.

Figure 3:
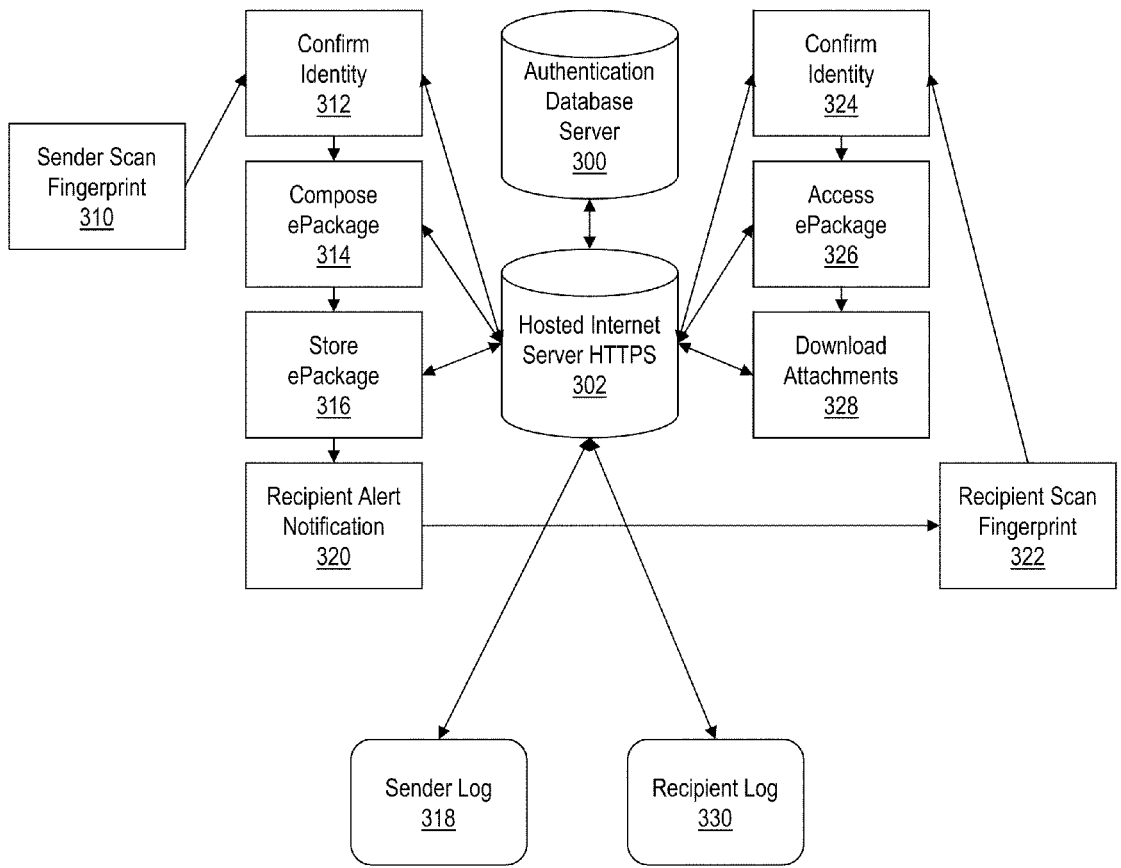
FIG. 3 is a flowchart of various processes interacting with an Authentication Database Server and a Hosted Internet Server for providing secure, certified electronic messaging according to an exemplary embodiment of the present invention.

Referring to FIG. 3, a flowchart illustrates various processes interacting with an Authentication Database Server 300 and a Hosted Internet Server 302 for providing secure, certified electronic messaging according to an exemplary embodiment of the present invention. As described herein, the secure, certified electronic message can be referred to as an "ePackage" that is a combination of pre-organized communication components (e.g., a package containing a text, a voice and/or video message, and attached files). An ePackage may have large file attachments, e.g., four gigabytes in size. With messages in text, audio, and video formats, ePackage recipients may either read the senders' textual messages, hear the senders speak the messages, or watch (and hear) them.

The present invention is built as a private network over the Internet, e.g., using secure connections over the Internet, rather than as an add-on to prior email protocols. The various process functions described herein can be executed on the Hosted Internet Server 302, and users interact with the Hosted Internet Server 302 via a web browser and, as a result, ePackages never leave the control of the Hosted Internet Server 302.

Interactive capabilities are accomplished using Active Server Pages (ASP) code and HyperText Markup Language (HTML) for screen rendering. Alternative embodiments may use PHP, .Net, Java, or other Internet environments. Data for user sessions are stored using a database management system, for example, Structured Query Language (SQL) server.

When a registered user logs into the Hosted Internet Server 302 to send an ePackage, a Hypertext Transfer Protocol Secure (HTTPS) connection is established between the user's computer, and the Hosted Internet Server 302. This layer of security can be enhanced by certified encryption, e.g. VeriSign or GeoTrust certifications. Here, the present invention can use Transport Layer Security (TLS) and its predecessor, Secure Sockets Layer (SSL), as cryptographic protocols that provide security and data integrity for communications over networks such as the Internet. TLS and SSL encrypt the segments of network connections at the Transport Layer end-to-end. The secure connection includes a secure web address and the user interacts with the Hosted Internet Server 302 via a browser, e.g. Internet Explorer, Firefox, Netscape, Safari, and the like. The system prompts the user, via a browser to enter login data, a part of which is the user's fingerprint. Alternatively, the system may accept a password from a user, but then the system marks messages for the session with a lesser authentication level.

In step 310, the Hosted Internet Server 302 can request a fingerprint scan of the user by displaying a fingerprint icon. A link to the Hosted Internet Server 302 can be pending waiting for the fingerprint scan. When a finger of a user who desires to log in and send a message is scanned, the Hosted Internet Server 302 receives a fingerprint image or numerical representation of the fingerprint from the user. The fingerprint scan can be accomplished via an off-the-shelf biometric scanner. In some embodiments, the fingerprint scanner is a USB device, such as the U.are.U 4000B USB Reader from Digitalpersona, Inc., attached to a personal computer. In other embodiments, the scanner is built into a person computer, such as an Upek built into a Dell laptop. In prior systems, the results from scanners would go into a PC or a LAN. In the present invention, the results of the scan are transmitted to a web-based, Hosted Internet Server 302 via a browser interface. Thus, the system is available for use worldwide.

The fingerprint scan results in an image of the user's fingerprint. The process can convert the image scanned to an index (i.e., a long numeric number) that uniquely identifies the finger. In some embodiments, the conversion is done with a hash index and public and private key encryption. In step 312, the process generally uses a standard "public key/private key" technique to safeguard a user password. Accordingly, the index created from the users fingerprint is encrypted as further described below regarding step 406 of FIG. 4. The present invention uses a three tier procedure to accomplish authentication. Tier 1: The local computer reads the scan and creates a numeric key (public key). Tier 2: The public key is transmitted to the Hosted Internet Server 302. Tier 3: The Hosted Internet Server 302 transmits a request to the Authentication Database Server 300, and the public key must correctly match the private key to get authentication. This very secure process, if identity is authenticated, allows the registered user further access to the system.

After successful identity authentication, the user is inside a secure area of the process and can access multiple functions. The user can choose next to compose an ePackage. As shown in step 314, the user composes an ePackage. The user enters (creates or assembles) the components of the ePackage via a web-based graphical user interface (GUI). In step 316, the process stores the ePackage components into an SQL database on the Hosted Internet Server 302. The process then allows the user/sender to perform other tasks, e.g. review a log of previously sent ePackages provided by the process in step 318. The process may also receive a logoff indication from the user.

After the user submits the ePackage, in step 320, the process sends an alert notification to the recipient(s) chosen by the sender during the ePackage composition step. Each recipient receives an alert as indicated by the sender. The alerts may be in the form of, e.g. an email alert, a cell phone text messaging alert, a voice alert, or a combination thereof based on the senders choice and the capabilities of the recipient. The recipient may either log in to the system as a user or the recipient could click on an alert link to the system that was sent to them in step 318. The alert link may show the recipient only the sender's name and contact information and the sender's identity authentication level so that the recipient can make an informed decision about taking delivery of the actual ePackage.

In step 322, the process allows an ePackage recipient to access the system. The step is analogous to step 310 used to allow senders access to the system. When the recipient logs in or clicks the alert link they are now able to take delivery of the ePackage, but must first be authenticated in accordance with the identity verification requirements requested by the sender. The sender may have requested an electronic signature, an access code, a fingerprint scan, another identifier, or a combination thereof. The system will then authenticate the recipient to make sure they meet the requested identity authentication level. If a fingerprint is requested, in step 322, the process displays a fingerprint icon and a link to the server will be pending and waiting for the recipient's scan. In step 324, the process then authenticates the identity of a recipient in a manner essentially similar to that used in step 312 to authenticate the identity of a sender.

After successful recipient authentication, in step 326, the system presents the ePackage for access via the user's browser, and the user may read the message text, listen to the sender's voice recording by simply clicking a speaker icon, or view the sender's video by clicking a video icon. In step 328, the user may then choose to view or download the attachments that the sender may have included. If the recipient is a registered user, they may then perform other system tasks or simply logoff.

During each of the steps in the biometric ePackage process, the process writes an event log record into the SQL database. In step 318, the process provides senders with real-time status/tracking information of their ePackages via the sender log. The process may optionally send an activity notification to the sender, for example, by text message alert, when the sender's ePackage was received/accessed/downloaded by the intended recipient. In step 318, the process provides senders with detailed logs of what activities each recipient has taken. Senders log in to the system via steps 310 and 312 to access this information. These logs may be printed or electronically sent to provide evidence of proof of delivery and proof of the content of messages and files in an ePackage. In step 330, the process provides ePackage recipients with status/tracking information analogous to that provided senders in step 318. Recipients must be registered users to view their recipient logs, to see their previous ePackages, and to access proof of delivery.

Figure 4:
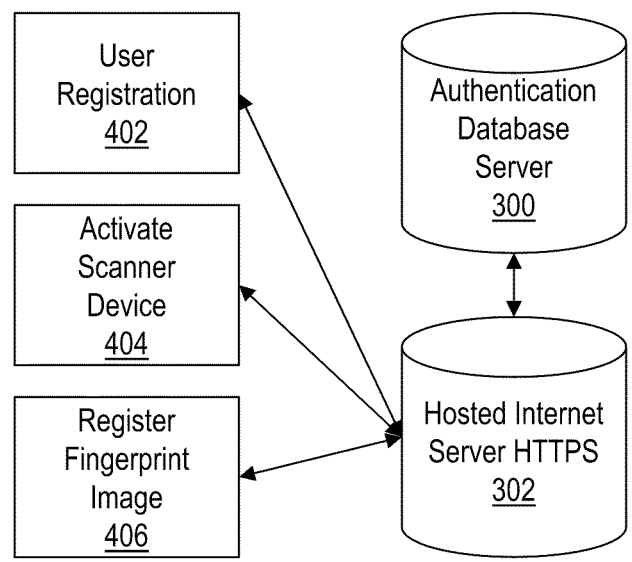
FIG. 4 is a flowchart of various processes interacting with the Authentication Database Server and the Hosted Internet Server for providing biometric authentication according to an exemplary embodiment of the present invention.

Referring to FIG. 4 a flowchart illustrates various processes interacting with the Authentication Database Server 300 and the Hosted Internet Server 302 for providing biometric authentication according to an exemplary embodiment of the present invention. For the process to allow a user to access the Hosted Internet Server 302 with a high level of identity authentication, the process must have previously registered both a scanner device and the user's fingerprint image. The process registers users to access the system in step 402. When a user of the system initially registers, it includes specifying a password. When a user is ready to enhance their service from password-level verification to fingerprint scan authentication, they access a "my account area" of the system. In the "my account area," the process creates and updates user information, such as, email address, phone numbers, and mailing address. In step 404, the process activates one or more fingerprint scanners for the previously registered user. The scanner may be a built in model or a USB model that can be attached to a computer. The process activates the scanner by running a program on the local computer. The program checks for compatibility of the local computer and the scanner. Compatibility may include information such as the computer manufacturer and driver type for the fingerprint reader. The program acquires this information by, for example, reading machine register device records. The installation program may install any missing software components along with scanner client software.

After successful completion of step 404, the system can use the activated scanner device with the user's account. The system allows scanners to be physically interchangeable, but the computer must have the proper drivers for its scanner type. After scanner activation, in step 406, the process registers a fingerprint image of the user. In this step, the user's fingerprint scanner is started, the user is requested to select a finger and make multiple scans. Repeated scans help ensure that the process creates a good repeatable public and private key for matching algorithms. The private key is then stored on the Authentication Database Server 300 and the public key is stored in the user record on the Hosted Internet Server 302. The user is now registered to access the system and to send and receive ePackages with identity authenticated by fingerprint.

Although fingerprints are the form of biometric identification described herein, other biometric identifiers are also contemplated by the present invention. For example, other biometric identifiers can include iris scans, facial scans, or DNA indicia. These biometric identifiers may be used individually or in combination. Additionally, a combination of biometric identifiers may be used along with smart cards or other devices that may be carried by a user.

Figure 5A:
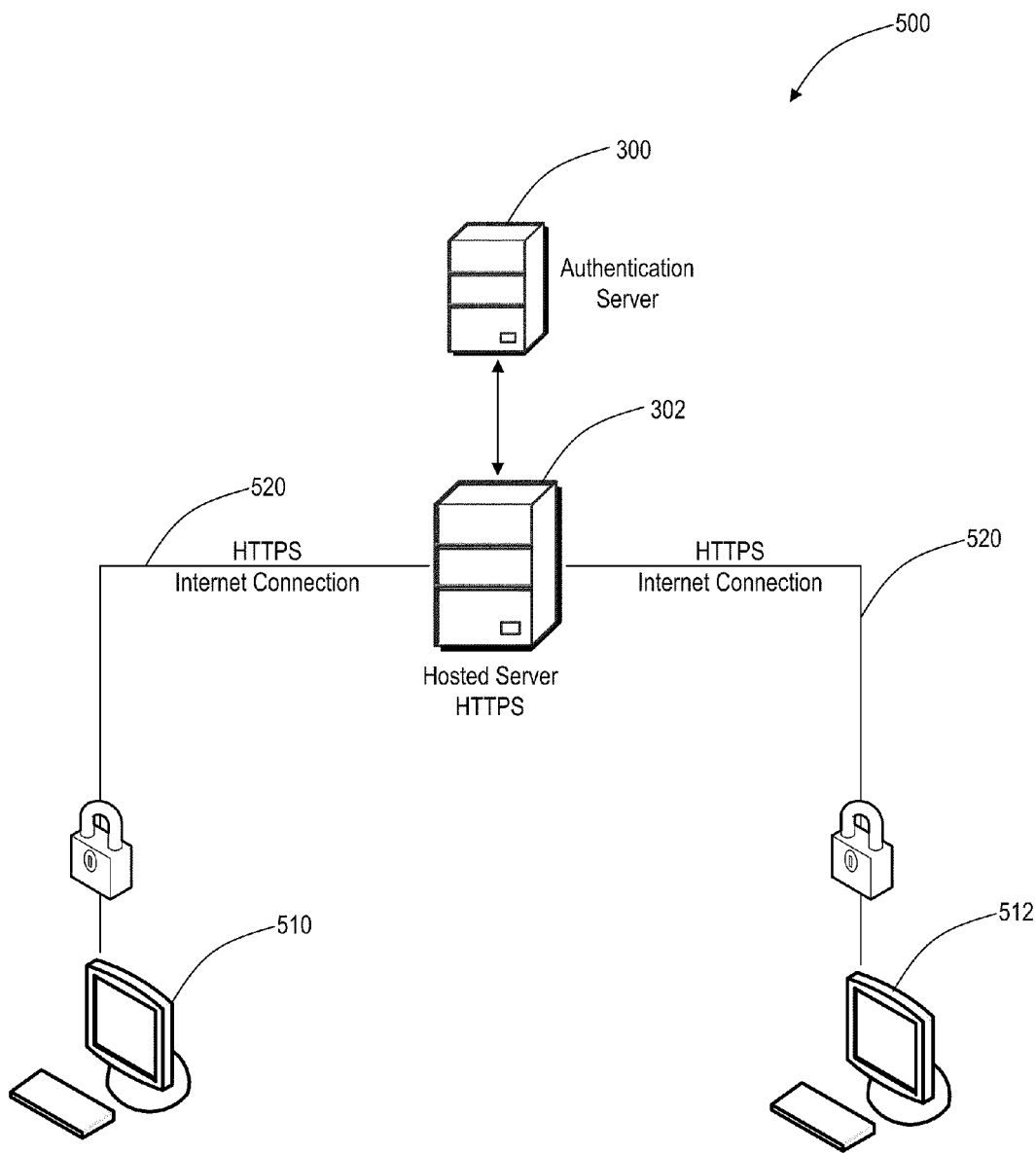
FIGS. 5A and 5B are diagrams of networks illustrating secure, certified electronic exchange according to exemplary embodiments of the present invention.
Figure 5B:
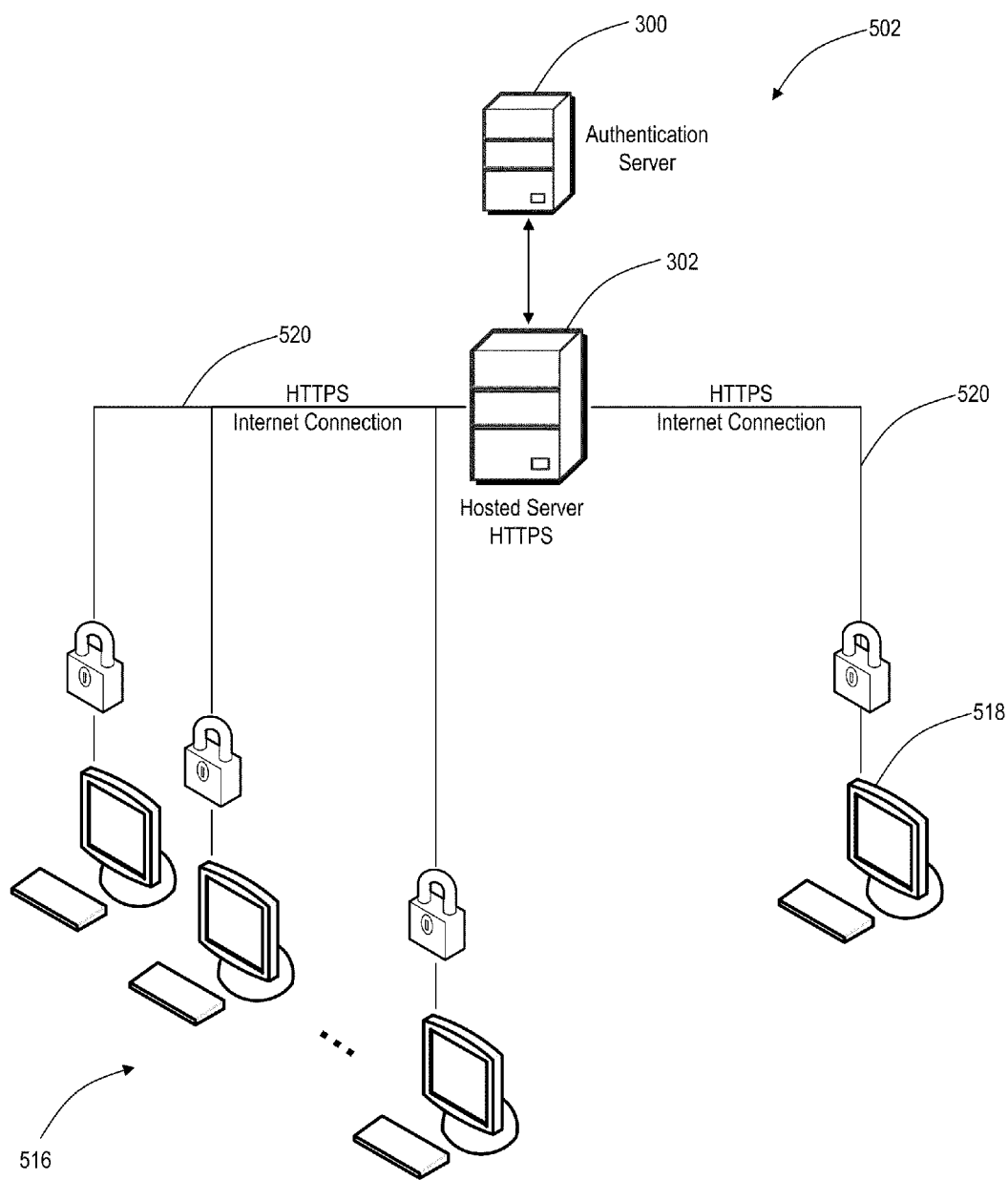

Referring to FIGS. 5A and 5B, diagrams of networks 500, 502 illustrate secure, certified electronic exchange according to exemplary embodiments of the present invention. FIG. 5A illustrates the network 500 showing secure message exchange between users 510, 512, i.e. a message exchange between two users. FIG. 5A illustrates the network 600 showing secure message exchange between a plurality of users 516 and a user 518, i.e. a message exchange between multiple users and a single user. The present invention contemplates other scenarios as well such as a message exchange between a plurality of users to two or more users.

In the present invention, all users (message senders and recipients) communicate with the Hosted Internet Server 302 utilizing Hypertext Transfer Protocol Secure (HTTPS) connections 520 over the Internet. This differs from conventional electronic message exchange where email messages are sent between the users' mail servers. The ePackages are created and sent/received to/from the Hosted Internet Server 302 through HTTPS 520 connections and thus are always secure. HTTPS is a combination of the Hypertext Transfer Protocol (HTTP) and a cryptographic protocol (e.g. a true 512-bit SSL). Existing web browsers (i.e., Internet Explorer, Firefox, Netscape, Safari, and the like) are configured with integrated HTTPS support, i.e. the users 510, 512, 516, 518 can directly access the Hosted Internet Server 302 over HTTPS with their web browsers. Accordingly, the present invention provides transmission, storage, path and identity verification.

The HTTPS 520 connections encrypt a session with a digital certificate i.e., HTTP over SSL (Secure Sockets Layer) which can be used by Web browsers and HTTPS—capable client programs. A secure website first sends a user's browser a public encryption key, which is used to construct another, unique, non-public encryption key. This key, which is known only to the web server and the user, is then used to protect all subsequent transfers of information. In practice, SSL provides a secure tunnel between two points on the Internet. Files transferred along this tunnel are wrapped in a layer of encryption that makes them impossible for third parties to view or compromise. Using this SSL solution, the present invention can ensure complete data confidentiality. The encryption methods used are based on keys only available to the user and the Hosted Internet Server 302, making it virtually impossible to decode the data sent, even if it is intercepted. This SSL solution also ensures data integrity—no outside source can modify data as it travels between an end user and the Hosted Internet Server 302. If data is changed in transit, the protocol automatically recognizes the modification and asks the client to resubmit the file.

The network 500 illustrates an example where the user 510 sends an ePackage to the user 512. Here, the user 510 logs into the Server 302 over the HTTPS connection 520 and composes text, audio, video, and/or attachments that are stored on the Server 302. The user 512 is notified as specified by the user 510 and the user 512 logs into the Server 302 over the HTTPS connection 520 to view and/or download the ePackage.

The network 502 illustrates another example where the plurality of users 516 can send an ePackage to the user 518. This example is akin to a Corporate Secure Inbox where the plurality of users 516 can provide ePackages certified and secure to the user 518. For example, the user 518 can include a shipping/package delivery company, a hospital or other medical organization, a law office, or the like. Here, the plurality of users 516 can be providing the ePackage to the user 518 for a variety of purposes, such as to ship important documents, provide medical records, provide legal documents, etc. In an exemplary embodiment, the plurality of users 516 may be completely unaware of the underlying secure processes described herein. For example, the user 518 may provide an inbox link on their website. This inbox link can take the plurality of users 516 to the Hosted Internet Server 302 and the plurality of users 516 can provide the ePackage accordingly.

As shown in FIGS. 5A and 5B, the present invention does not utilize the traditional "store and forward" method of electronic messaging, which can leave copies of emails on multiple servers around the Internet. The present invention encrypts ePackage contents, sends them over a private pathway of the Internet to the Hosted Internet Server 302 and never interacts with another email system. The recipient then downloads the encrypted message through another private pathway to their own computer. All ePackages can be encrypted with T-DES or with the Advanced Encryption Standard (AES). Additionally, this encryption can prevent network operators of the Hosted Internet Server 302 from viewing the contents of stored ePackages.

Figure 6:
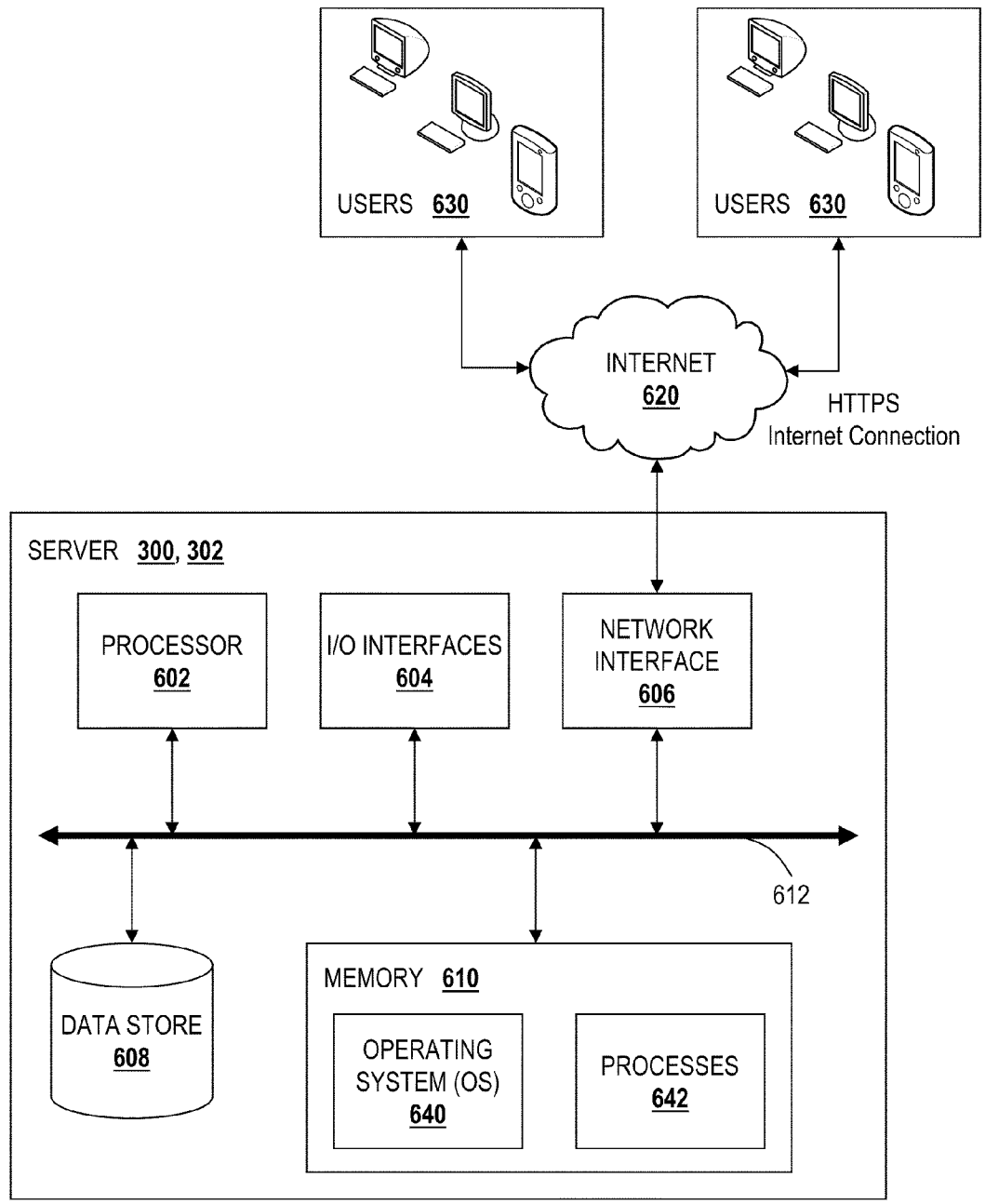
FIG. 6 is a diagram of various components of the Authentication Database Server and the Hosted Internet Server according to an exemplary embodiment of the present invention.

Referring to FIG. 6, a diagram illustrates various components of the Authentication Database Server 300 and the Hosted Internet Server 302 according to an exemplary embodiment of the present invention. The servers 300, 302 can be a digital computer that, in terms of hardware architecture, generally includes a processor 602, input/output (I/O) interfaces 604, network interfaces 606, a data store 608, and memory 610. The components (602, 604, 606, 608, 610) are communicatively coupled via a local interface 612. The local interface 612 can be, for example but not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 can include address, control, and/or data connections to enable appropriate communications among the aforementioned components.

The processor 602 is a hardware device for executing software instructions. The processor 602 can be any custom made or commercially available processor, a central processing unit (CPU), an auxiliary processor among several processors associated with the server 300, 302, a semiconductor-based microprocessor (in the form of a microchip or chip set), or generally any device for executing software instructions. When the server 300, 302 is in operation, the processor 602 is configured to execute software stored within the memory 610, to communicate data to and from the memory 610, and to generally control operations of the server 300, 302 pursuant to the software instructions.

The I/O interfaces 604 can be used to receive user input from and/or for providing system output to one or more devices or components. User input can be provided via, for example, a keyboard and/or a mouse. System output can be provided via a display device and a printer (not shown). I/O interfaces 604 can include, for example, a serial port, a parallel port, a small computer system interface (SCSI), an infrared (IR) interface, a radio frequency (RF) interface, and/or a universal serial bus (USB) interface.

The network interfaces 606 can be used to enable the server 300, 302 to communicate on a network, such as the Internet 620. For example, the server 300, 302 can utilize the network interface 20 to communicate to multiple users 630 using HTTPS over the Internet 620. The users 630 can include desktop computers connected to the Internet 620 via a high-speed connection (DSL, Cable modem, WiMax, Cellular, etc.), laptop computers connected to the Internet 620 via the high-speed connection, mobile devices connected to the Internet 620 via a mobile network, and the like. Each user 630 can also include a network interface to communicate to the server 300, 302 to access the various processes described herein. The network interfaces 606 can include, for example, an Ethernet card (e.g., 10BaseT, Fast Ethernet, Gigabit Ethernet) or a wireless local area network (WLAN) card (e.g., 802.11a/b/g). The network interfaces 606 can include address, control, and/or data connections to enable appropriate communications on the network.

A data store 608 can be used to store data, such as various ePackages from the users 630 and the tracking data in the sender and recipient logs associated with each ePackage. The data store 608 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 can incorporate electronic, magnetic, optical, and/or other types of storage media. In one example, the data store 608 can be located internal to the server 300, 302 such as, for example, an internal hard drive connected to the local interface 612 in the server 300, 302. Additionally in another embodiment, the data store 608 can be located external to the server 300, 302 such as, for example, an external hard drive connected to the I/O interfaces 604 (e.g., SCSI or USB connection). In yet another embodiment, the data store 608 can be connected to the server 300, 302 through a network, such as, for example, a network attached file server.

The memory 610 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 may incorporate electronic, magnetic, optical, and/or other types of storage media. Note that the memory 610 can have a distributed architecture, where various components are situated remotely from one another, but can be accessed by the processor 602. The software in memory 610 can include one or more software programs, each of which includes an ordered listing of executable instructions for implementing logical functions. The software in the memory 610 includes a suitable operating system (O/S) 640 and various processes 642. The operating system 640 essentially controls the execution of other computer programs, such as the various processes 642, and provides scheduling, input-output control, file and data management, memory management, and communication control and related services. The operating system 640 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like.

The various processes 642 include the various processes described herein with respect to the Authentication Database Server 300 and the Hosted Internet Server 302 enabling the exchange of secure and certified electronic messages. In an exemplary embodiment, the Authentication Database Server 300 and the Hosted Internet Server 302 can be on separate systems. In another exemplary embodiment, the Authentication Database Server 300 and the Hosted Internet Server 302 can reside in the same system.

Figure 7:
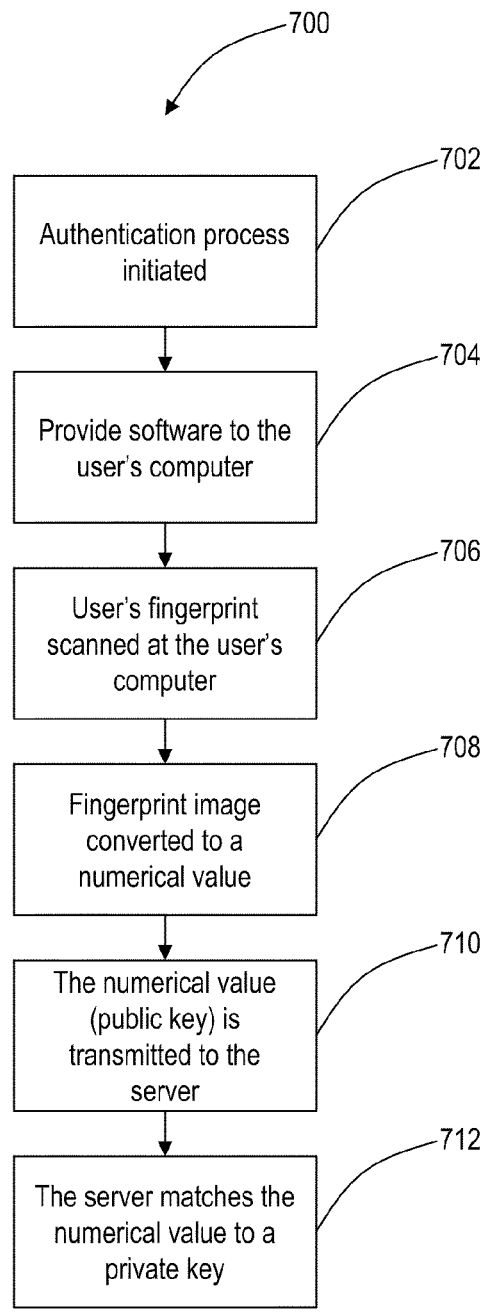
FIG. 7 is a flowchart of an authentication process for authenticating a user via a fingerprint over the Internet according to an exemplary embodiment of the present invention.

Referring to FIG. 7, a flowchart illustrates an authentication process 700 for authenticating a user via a fingerprint over the Internet according to an exemplary embodiment of the present invention. The process 700 operates on a user's computer equipped with a fingerprint scanning device and a server connected to the user's computer over the Internet. Advantageously, the process 700 enables remote authentication of a user over the Internet. The authentication process 700 is initiated (step 702). The authentication process 700 initiates when there is a need to remotely authenticate a user through the server biometrically. Software is provided to the user's computer from the server over the Internet (step 704). Here, the server provides software to functionally control the remote capture of the user's fingerprint. This can include ASP code, PHP, .Net, Java, or other Internet environments. The software can be provided using VeriSign Code Signing Digital IDs that provide a digital signature to software and macros including Microsoft Authenticode, Microsoft Office and VBA Signing, Sun Java Signing, Adobe Air, Netscape Object Signing, Macromedia Shockwave, and Marimba Castanet Channel Digital IDs for secure delivery over the Internet. Digital IDs are virtual "shrinkwrap" for your software; if your code is tampered with in any way after it is signed, the digital signature will break and alert customers that the code is not trustworthy.

Once loaded, the software prompts the user to provide a fingerprint scan, and the user's fingerprint is scanned at the user's computer through a scanned connected to the computer (step 706). The fingerprint scan results in an image of the user's fingerprint. This image is converted to a numerical value (i.e., a long numeric number) that uniquely identifies the user (step 708). In some embodiments, the conversion is done with a hash index and public and private key encryption. This numerical value is similar to a bar code in a retail store. Also, the process 700 does not keep or transmit the fingerprint image. The numerical value is transmitted over the Internet to the server (step 710). This numerical value acts as a public key that is transmitted over the Internet to the server (operating as a host server). Once the server receives this numerical value (public key), the server provides this numerical value to an authentication database of private keys (step 712). If the numerical value matches, then the user is authenticated.

Figure 8:
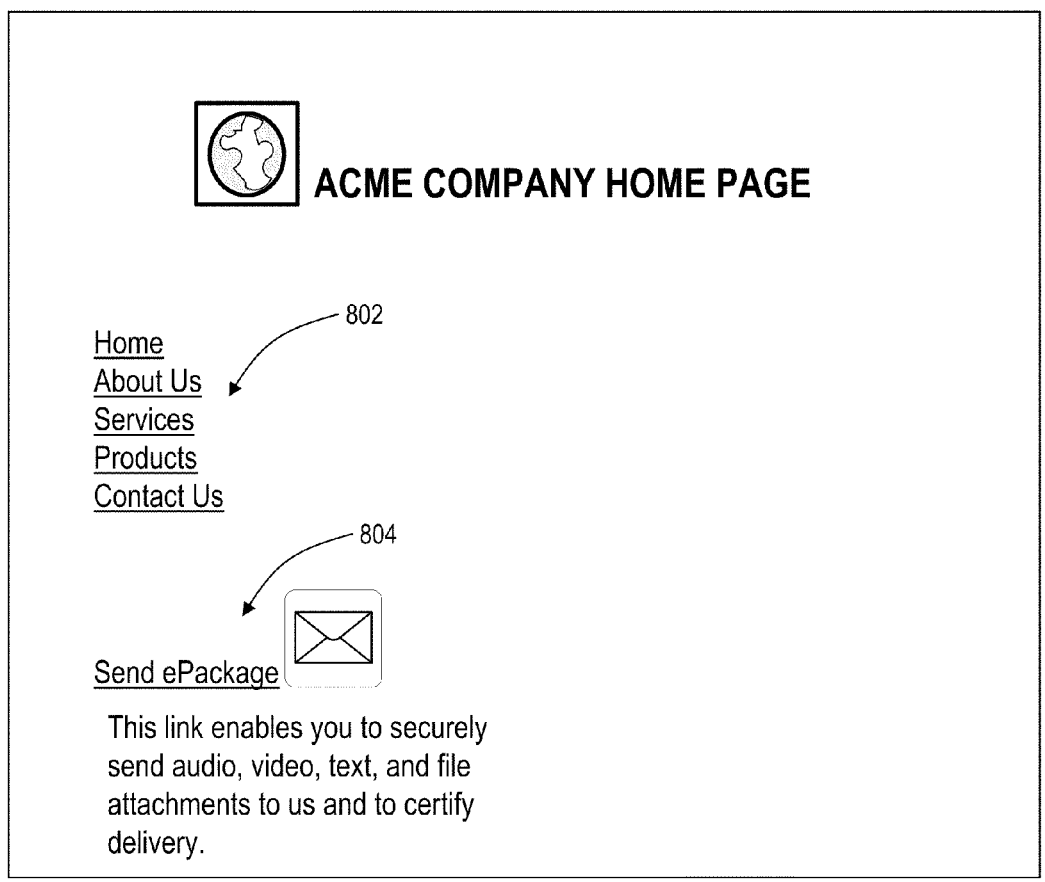
FIG. 8 is a webpage illustrating sending a certified ePackage according to an exemplary embodiment of the present invention.

Referring to FIG. 8, a webpage 800 illustrates sending a certified ePackage according to an exemplary embodiment of the present invention. The exemplary webpage 800 is a home page for the "Acme Company." The webpage 800 is a document or resource of information that is suitable for the World Wide Web (WWW) and can be accessed through a web browser and displayed on a computer screen. This information is usually in HTML or XHTML format, and may provide navigation to other web pages via hypertext links. For example, the webpage 800 includes a plurality of links 802 for navigation to various other pages, such as About Us, Services, Products, and Contact Us. Practically every business, organization, and the like have a so-called home page on the Internet. Once of the typical links on the webpage 800 is a "contact us" link that provides telephone, fax, email, driving directions, and the like, i.e. all relevant contact information for the business or organization.

In an exemplary embodiment, a "send ePackage" link 804 can be included on the webpage 800. This link 804 enables any web user to send a certified and secure ePackage to a mailbox associated with the owner (or any other designee) of the webpage 800. Any user can click on the link 804 to send the ePackage of audio, video, text, and/or file attachments to the owner of the webpage 800. Also, the process of sending the ePackage can be transparent to the users. For example, a user could click on the link 804 thereby initiating an HTTPS session to the Hosted Internet Server 302, the user could provide the required validation information (biometric, etc.) or register as required, and then compose/send the ePackage. Advantageously, this provides a novel way to implement a standard "contact us" page providing a secure and certified contact mechanism. This is a simple and effective method for existing webpage owners to receive secure and certified messages from clients, customers, prospects, and the like.

Also, the "send ePackage" link 804 can be a one-click link to send a secure, certified ePackage. Here, the sender does not have to register or be authenticated to send the ePackage over the "send ePackage" link 804. Specifically, the senders simply click on the link 804 and are brought to an interface to send the ePackage. All of the mechanisms of the present invention are "under the hood" so the sender is unaware of the secure transmission and storage attributes.

Referring to FIG. 9, a webpage 900 illustrates a UI for sending a certified ePackage according to an exemplary embodiment of the present invention. The exemplary webpage 900 allows any web user to send a message along with secure attachments directly to the webpage 900 owner or the like using the secure messaging mechanisms of the present invention. The webpage 900 is a document or resource of information that is suitable for the World Wide Web (WWW) and can be accessed through a web browser and displayed on a computer screen. This information is usually in HTML or XHTML format, and may provide navigation to other web pages via hypertext links. The webpage 900 is hosted by a host server that connects to the Internet. The webpage 900 includes contact fields 902 for the web user to fill in their name, email (with confirmation), phone number, and any text for comments with the message. An attachment list 904 allows the web user to add multiple files by clicking on a browse button 906 which enables the web user to select a file for attachment (e.g., this can bring up a file or directory list to select the applicable file). The attachment list 904 is illustrated with five attachments, but the number can include more, e.g. ten, or an option to add another attachment to allow any arbitrary number of attachments o be added. Finally, once the message is complete, the web user can select send 908 to complete transmission of the secure ePackage.

The present invention contemplates use with healthcare organizations, government applications, financial services, and other strategic services to provide the utmost security and certification with the exchange of electronic messages. For healthcare, the ePackage provides Health Insurance Portability and Accountability Act (HIPAA) compliance allowing doctors, patients, insurers, and the like to communicate medical records electronically. Also, the ePackage provides compliance to the various security requirements in Sarbanes Oxley (SOX), Gramm-Leach-Bliley Act (GLBA), The Personal Information Protection and Electronic Documents Act, FTC Red Flag, etc. Of note, the present invention requires no hardware and/or software investment on behalf of any organization utilizing the various processes described herein. The Authentication Database Server 300 and the Hosted Internet Server 302 operate over standard HTTPS connections already integrated in conventional web browsers.

Advantageously, the present invention shields sensitive data from hackers, identity thieves, phishing, spamming and unwanted disclosure. File size which is typically limited in email systems is not an issue. The present invention provides an easy method to comply with various security mandates and regulations without infrastructure investment. The proof of delivery processes provides protection from claims of non-delivery and disputes over content along with options for indisputable identity verification using biometric (fingerprint) authentication. Such indisputable identity verification is even superior to conventional paper delivery methods. Thus, the present invention provides complete control of sensitive documents using distribution and storage and a solution to the risks of intercompany communications (i.e., external business exchanges worldwide).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An electronic messaging method, comprising:
    receiving a request to send an electronic message from a sender to a recipient, wherein the electronic message comprises any of text, audio, video, and file attachments;
    authenticating the sender of the electronic message at an authentication server remote from the sender and the recipient;
    receiving the electronic message at a hosted server remote from the sender and the recipient through a first secure connection;
    storing the electronic message on the hosted server;
    alerting the recipient that the electronic message is pending; and
    delivering the electronic message through a second secure connection from the hosted server to the recipient;
    wherein the authenticating the sender comprises:
        sending software code to the sender to initiate a biometric authentication;
        acquiring biometric information of the sender;
        creating a numerical index of the biometric information to form a public key;
        receiving the public key at the authentication server over a third secure connection; and
        authenticating the public key with a corresponding private key at the authentication server.

2. The electronic messaging method of claim 1, further comprising:
    registering the sender prior to receiving the request to send the electronic message, wherein registering comprises capturing a fingerprint scan of the sender and storing a private key in the authentication server responsive to the fingerprint scan.

3. The electronic messaging method of claim 1, wherein the authenticating the sender comprises:
    sending the software code to the sender to initiate the biometric authentication;
    scanning a fingerprint of the sender;
    creating a numerical index of the fingerprint responsive to the scanning a fingerprint to form a public key;
    receiving the public key at the authentication server over a third secure connection; and
    authenticating the public key with a corresponding private key at the authentication server.

4. The electronic messaging method of claim 1, further comprising:
    encrypting the electronic message prior to storing the electronic message.

5. The electronic messaging method of claim 4, wherein the electronic message is encrypted with one of Triple Data Encryption Standard (T-DES) and Advanced Encryption Standard (AES) encryption and stored in a secure data store.

6. The electronic messaging method of claim 1, wherein the first secure connection and the second secure connection each comprise a Hypertext Transfer Protocol Secure (HTTPS) connection.

7. The electronic messaging method of claim 1, further comprising:
    tracking the electronic message by updating a log responsive to activity associated with the electronic message; and
    certifying delivery of the electronic message responsive to authenticating the recipient and delivering the electronic message to the recipient.

8. The electronic messaging method of claim 1, further comprising:
    providing a webpage for an organization; and
    providing a Uniform Resource Locator link for a corporate inbox comprising the recipient;
    wherein the sender initiates the receiving, authenticating, receiving, storing, alerting, and delivering steps responsive to clicking on the Uniform Resource Locator link.

9. The electronic messaging system of claim 1, further comprising:
    a webpage for an organization; and
    a Uniform Resource Locator link for a corporate inbox comprising the recipient, wherein the Uniform Resource Locator link is located on the webpage.

10. An electronic messaging system, comprising:
a hosted server comprising a network interface connected to the Internet, a data store comprising storage for electronic messages and software code, and a processor; and
an authentication database connected to the hosted server, wherein the authentication database comprises a plurality of private keys for authenticating a plurality of users;
wherein the hosted server and the authentication database are remotely located from a sender and a recipient of an electronic message; and
wherein the processor is configured to:
receive a request to send the electronic message from the sender to the recipient, wherein the electronic message comprises any of text, audio, video, and file attachments;
authenticate the sender of the electronic message through a comparison of a public key with the plurality of private keys at the authentication database, wherein the public key is generated locally by the sender from biometric information;
receive the electronic message through a first secure connection;
store the electronic message in the data store;
alert the recipient that the electronic message is pending; and
deliver the electronic message through a second secure connection to the recipient.

11. The electronic messaging system of claim 10, wherein the processor is further configured to:
register the sender prior to receiving the request to send the electronic message, wherein registering comprises capturing a fingerprint scan of the sender and storing a private key in the authentication database responsive to the fingerprint scan.

12. The electronic messaging system of claim 11, wherein to authenticate the sender the processor is configured to:
send software code to the sender to initiate a biometric authentication.

13. The electronic messaging system of claim 10, wherein the electronic message is encrypted prior to storage in the data store.

14. The electronic messaging system of claim 13, wherein the electronic message is encrypted with one of Triple Data Encryption Standard (T-DES) and Advanced Encryption Standard (AES) encryption.

15. The electronic messaging system of claim 10, wherein the first secure connection and the second secure connection each comprise a Hypertext Transfer Protocol Secure (HTTPS) connection.

16. The electronic messaging system of claim 10, wherein the processor is further configured to:
track the electronic message by updating a log responsive to activity associated with the electronic message; and
certify delivery of the electronic message responsive to authenticating the recipient and delivering the electronic message to the recipient.

* * * * *